R. KUNZMANN & E. STIERLE.
METHOD OF SOLDERING CHAIN LINKS.
APPLICATION FILED JAN. 12, 1910.
970,726.
Patented Sept. 20, 1910.
2 SHEETS—SHEET 1.
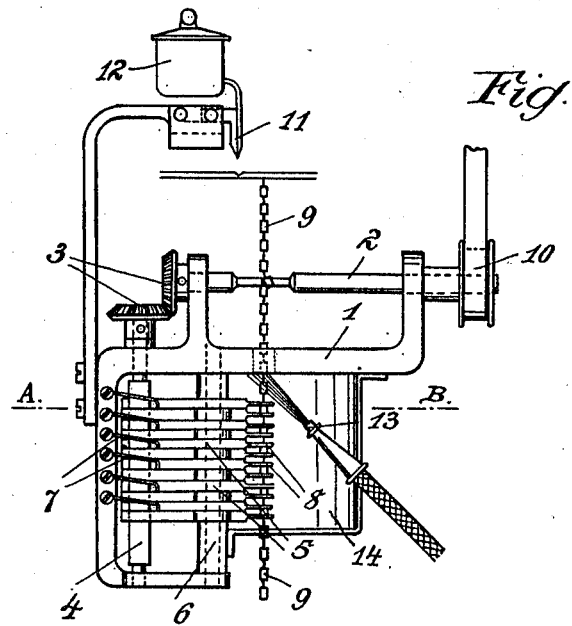
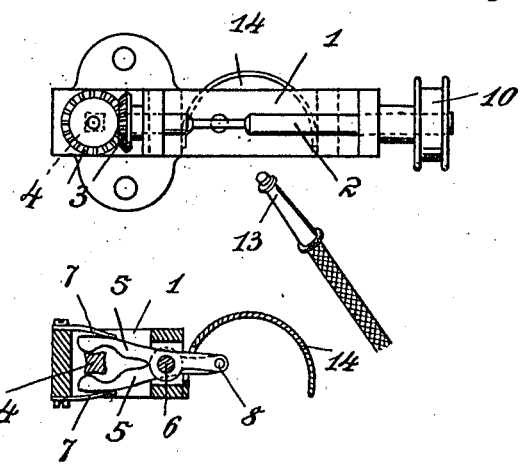
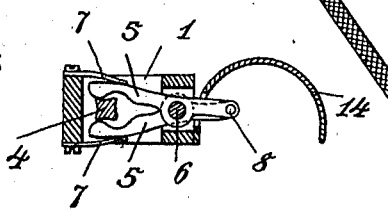
Witnesses:—
Inventors:—

R. KUNZMANN & E. STIERLE.
METHOD OF SOLDERING CHAIN LINKS.
APPLICATION FILED JAN. 12, 1910.

970,726.

Patented Sept. 20, 1910.

2 SHEETS—SHEET 2.

Witnesses:—

Inventors:—
Rudolf Kunzmann
and
Erwin Stierle
by their attorneys

UNITED STATES PATENT OFFICE.

RUDOLF KUNZMANN AND ERWIN STIERLE, OF PFORZHEIM, GERMANY, ASSIGNORS TO THE FIRM OF ANDREAS DAUB, OF PFORZHEIM, GERMANY.

METHOD OF SOLDERING CHAIN-LINKS.

970,726.  Specification of Letters Patent.  Patented Sept. 20, 1910.

Application filed January 12, 1910. Serial No. 537,722.

*To all whom it may concern:*

Be it known that we, RUDOLF KUNZMANN, mechanical engineer, and ERWIN STIERLE, mechanical engineer, both subjects of the German Emperor, and residents of Pforzheim, in the Grand Duchy of Baden, Germany, the post-office address of RUDOLF KUNZMANN being Schossgatterweg 7, that of ERWIN STIERLE, Ebersteinerstrasse No. 6, have invented new and useful Improvements in Methods of Soldering Chain-Links, of which the following is a specification.

This invention relates to the manufacture of what are known as "case" chains, that is to say chains whereof the links are constituted of a core of inferior metal covered by a layer of precious metal. In the manufacture of these chains the opposed ends of the length constituting the link are attached to one another by means of a blowpipe flame the heat of which melts the core which passing between the ends of the length acts as a solder. It often happens however, that the heat causes a portion of the melted core or solder to exude through the space between the ends and when this occurs adjacent links become soldered together and the chain or at all events a portion of it becomes rigid. It has been proposed to obviate this by coating the entire chain with a preparation adapted to prevent the links from becoming soldered together, but this is disadvantageous inasmuch as the preparation is apt to find its way between the joints in the links and interfere with the soldering operation.

According to the present invention the soldering together of adjacent links is prevented by subjecting the chain, during the actual soldering operation, so long as its temperature is at or near the melting point of the solder to a shaking motion such that the links are caused to move continuously with relation to one another. The shaking of the chain it is true, has been practiced when the method referred to was adopted, but this was solely for the purpose of distributing the covering preparation uniformly over the chain and no shaking movement was imparted to the chain during its passage through the soldering flame or while the chain remained in a heated state.

Figure 4:
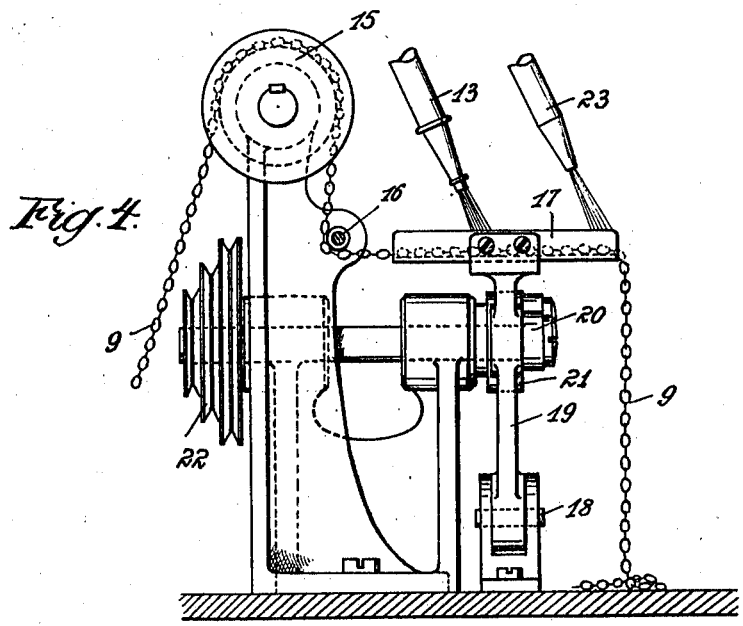
Figure 5:
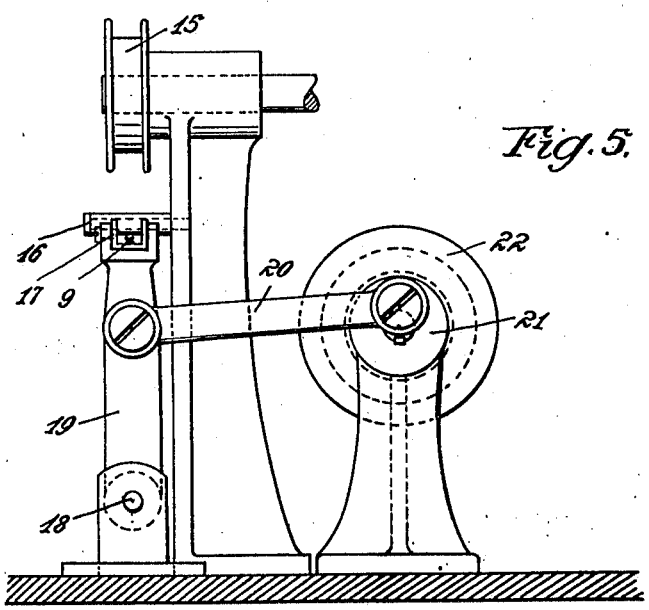

In the accompanying drawing Figure 1 shows a side elevation of a machine for carrying the method into operation, while Fig. 2 is a plan of the machine, and Fig. 3 a section on line A—B of Fig. 1. Figs. 4 and 5 show side and front elevations respectively of a second form of machine.

1 is the frame of the machine in which is mounted the spindle 2 which is geared by a pair of bevel wheels 3 with a shaft 4 of rectangular section.

5 are pairs of levers like scissors, arranged one above the other and pivoted on a shaft 6 and moved backward and forward when the machine is driven by reason of the square section of the shaft 4 acting against the ends of the levers which are pressed against the shaft by the springs 7. The forward ends 8 of the several levers are suitably formed for the passage of the chain 9 which passes through them in zigzag fashion.

10 is the driving pulley mounted on the shaft 2.

The machine can be used alone or in combination with a chain-making machine. In the former case the chain is twisted once around the spindle 2 which serves to feed it to the flame. If however, the machine is to be used in conjunction with a chain-making machine, the chain is fed by the latter and it need not be twisted around the spindle 2.

The liquid flux may either be supplied from the vessel 12 to the ends of each length while this is being cut by the cutting device 11, or just before the final closing of the link in course of formation, whereupon the chain is fed to the flame 13 and the joint is thus closed and the link rendered integral. In order to concentrate the heat of the flame as much as possible on the part to be soldered, a semi-circular shield 14 lined with asbestos or other non-conducting material may be provided.

In the modification shown in Figs. 4 and 5, the chain 9 first passes over a feed roller 15, then around a smaller roller 16 from which it travels horizontally through a trough 17. This trough is carried by a lever 19 which is pivoted at 18 and reciprocated by a connecting rod 20 attached to a crank or eccentric disk 21 driven by a cord passing around pulley 22. The speed of the disk 21 is so determined as to impart to the trough 17 a quick reciprocating movement. The soldering flame 13 is placed at such a position as to impinge on the chain lying in the trough 17 through which the chain 9 travels slowly, the links meanwhile being prevented from becoming soldered together owing to the chain being constantly shaken so long as the solder is in a softened condition. In this modification the chain travels horizontally through the shaking device, so that the weight of the chain does not exert any pull during the soldering process, a circumstance which contributes to prevent the soldering together of the links.

23 is a pipe situated at the delivery end serving to supply cold air for cooling the chain after the soldering has been effected.

Now what we claim and desire to secure by Letters Patent is the following:

1. The method of soldering chain links consisting in bringing the links charged with solder into contact with heat to soften the solder and shaking the chain during the soldering operation to prevent the links from becoming soldered to adjacent links.

2. The method of soldering chain links consisting in passing the chain composed of unsoldered links charged with solder along a suitable support into contact with heat to soften the solder and simultaneously with the soldering operation, shaking the chain to prevent the links from becoming soldered one to another.

In testimony, that we claim the foregoing as our invention, we have signed our names in presence of two witnesses, this 27th day of December 1909.

RUDOLF KUNZMANN.
ERWIN STIERLE.

Witnesses:
ERNEST L. IVES,
W. W. SCHMIDT.